(12) United States Patent
Pfaff et al.

(10) Patent No.: US 7,156,913 B2
(45) Date of Patent: Jan. 2, 2007

(54) INTENSELY COLORED RED EFFECT PIGMENTS

(75) Inventors: Gerhard Pfaff, Muenster (DE); Cornelia Foerderer, Heppenheim (DE); Doreen Warthe, Griesheim (DE); Johann Dietz, Dietzenbach (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/331,449

(22) Filed: Jan. 13, 2006

(65) Prior Publication Data
US 2006/0156949 A1 Jul. 20, 2006

(30) Foreign Application Priority Data
Jan. 17, 2005 (DE) .................... 10 2005 002 124

(51) Int. Cl.
*C09C 1/24* (2006.01)
*C09C 1/28* (2006.01)
*C09C 3/06* (2006.01)

(52) U.S. Cl. ............ 106/457; 427/215; 427/218; 427/255.19; 427/255.31; 428/403; 428/404

(58) Field of Classification Search ........... 106/457; 427/217, 255.19, 255.31, 218, 215; 428/403, 428/404
See application file for complete search history.

(56) References Cited

U.S. PATENT DOCUMENTS 5,354,374 A * 10/1994 Prengel .................. 106/459
5,441,564 A * 8/1995 Vogt ..................... 106/417
6,488,756 B1 * 12/2002 Schoen et al. ............ 106/415
6,517,628 B1 * 2/2003 Pfaff et al. ............... 106/417
6,630,018 B1 * 10/2003 Bauer et al. .............. 106/415
6,875,264 B1 * 4/2005 Zimmermann et al. .... 106/446

FOREIGN PATENT DOCUMENTS

WO  WO 93/08237 A1  4/1993

* cited by examiner

*Primary Examiner*—Anthony J. Green

(57) ABSTRACT

The present invention relates to intensely colored red effect pigments comprising iron oxide-coated $SiO_2$ flakes, where the total thickness of the effect pigments is not greater than 500 nm (+/−30 nm). The present invention likewise relates to processes for the preparation of these pigments in which $SiO_2$ flakes are coated with iron oxide, where the thicknesses of the $SiO_2$ flakes and of the iron-oxide layers are selected in such a way that the total thickness of the red effect pigments is not greater than 500 nm (+/−30 nm), and to the use of these pigments in cosmetics, paints, coatings, plastics, films, in security printing, in security features in documents and identity papers, for coloring seed, for coloring foods or in medicament coatings and for the preparation of pigment compositions and dry preparations.

10 Claims, 1 Drawing Sheet

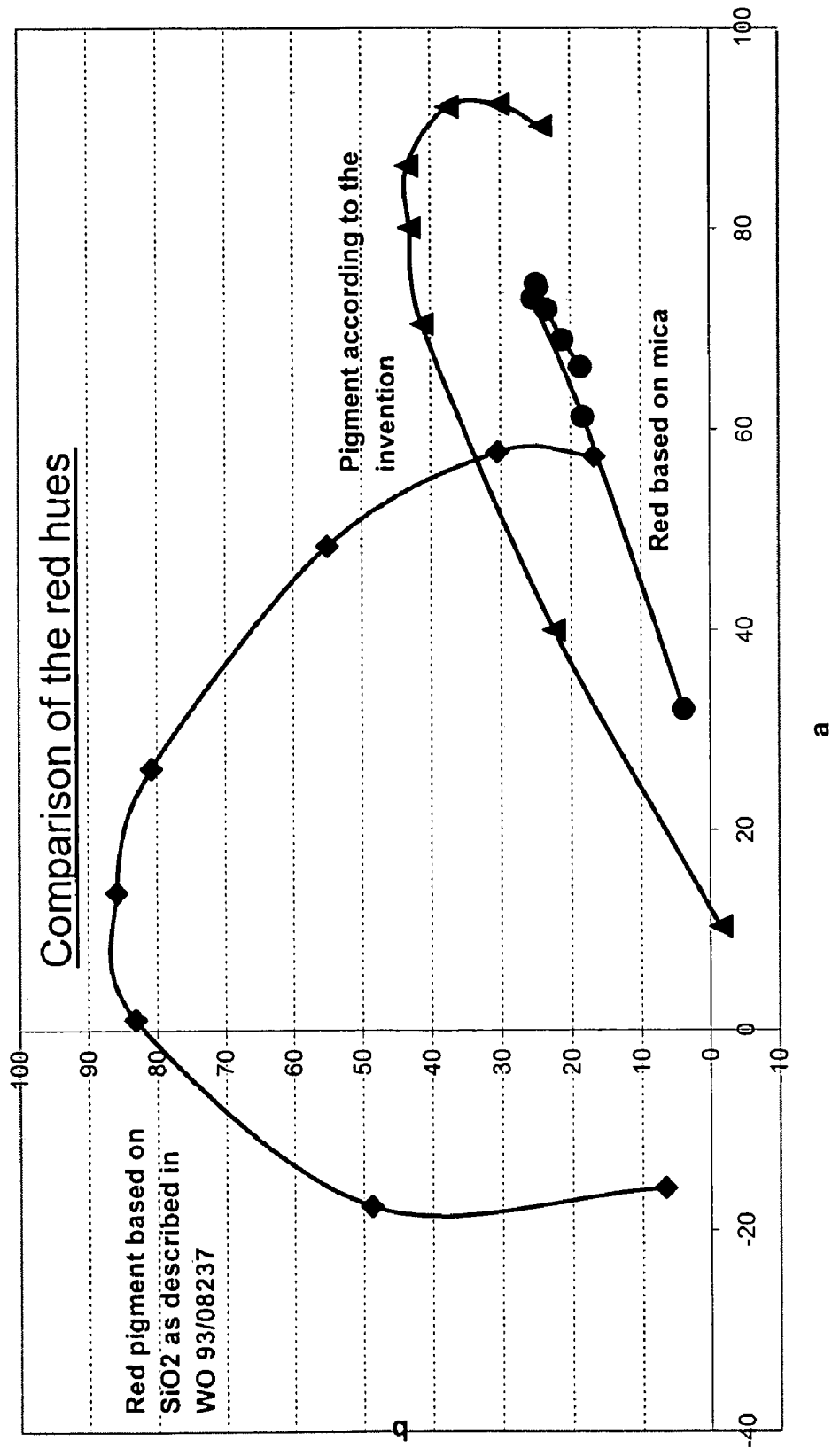
Figure 1: Comparison of the red hues of the pigments according to the invention with those from the prior art

INTENSELY COLORED RED EFFECT PIGMENTS

The present invention relates to intensely colored red effect pigments comprising iron oxide-coated $SiO_2$ flakes, where the total thickness of the effect pigments is not greater than 500 nm (+/−30 nm). The present invention likewise relates to processes for the preparation of these pigments in which $SiO_2$ flakes are coated with iron oxide, where the thicknesses of the $SiO_2$ flakes and the iron-oxide layers are selected in such a way that the total thickness of the red effect pigments is not greater than 500 nm (+/−30 nm), and to the use of these pigments in cosmetics, paints, coatings, plastics, films, in security printing, in security features in documents and identity papers, for coloring seed, for coloring foods or in medicament coatings and for the preparation of pigment compositions and dry preparations.

The use of red luster or effect pigments is widespread. Pigments of this type have become indispensable in automobile, paints, decorative coatings of all types and in the coloring of plastics, in paints and printing inks and in applications in decorative cosmetics. In the matrix surrounding them, these pigments ideally align themselves parallel to the surface of the coating and exhibit their optical action through a complex interplay of interference, reflection and absorption of the incident light. A bright color and high luster are the focus of interest for the various applications.

Pigments of this type are generally prepared by coating flake-form mica with metal-oxide layers, in particular iron-oxide layers. Mica, in particular, has the disadvantage that the thickness of the substrate varies in a broad range and cannot be set specifically, which results in light transmission and reflection at the substrate occurring in a substantially uncontrollable manner, even in the case of transparent substrates, and therefore being unusable in a specific manner. WO 93/08237 discloses flake-form red pigments which consist of a silicon dioxide matrix as substrate which is coated with an iron-oxide layer. The thickness of the matrix here can be set in a broad range. The red pigments described in WO 93/08237 have the disadvantage that, when tilted towards flatter viewing angles, they exhibit a brownish hue, which is undesired. Rather, there is a need for intensely colored red effect pigments having a pure red hue and high luster. In addition, the substrates have a thickness of 500 nm and the thicknesses of the applied layers are preferably 20–250 nm. Overall, pigments having a relatively large total thickness are thus obtained. However, this is unfavorable for many applications, since the applicational properties of the pigments are impaired, a phenomenon which is described, for example, by P. Hoffmann, W. Duschek, New Effect Pigments, in report volume DFG 41, 1999, 50, 123–132. In coating applications, for example, thick pigments exhibit problems with the target parallel alignment. The unfavorable geometry of the relatively thick pigment particles makes the desired alignment parallel to the surface more difficult in the binder system. Relatively thick pigment particles tend to line up at an angle to one another, and consequently the light is no longer reflected in the optimum direction and scattering effects reduce the directed luster. In addition, applicational disadvantages arise, such as, for example, an increased haze effect (luster fog) and a worse distinctness of image (DOI) of the pigment-containing coatings. Furthermore, coloristic disadvantages arise merely through the fact that the high mass of the individual particles for the same mass weight means that there is a considerably smaller number of pigment particles in the coating application. This has disadvantageous effects on the hiding power, the luster and the overall color impression. The desired properties therefore can only be achieved with difficulty in the case of thick pigment particles.

The object was therefore to find red effect pigments having improved optical properties, in particular having a pure red hue, which can be employed universally in a very wide variety of applications without exhibiting applicational disadvantages.

The above-mentioned object is achieved by pigments according to the present invention. The present invention accordingly relates to intensely colored red effect pigments comprising iron oxide-coated $SiO_2$ flakes, where the total thickness of the effect pigments is not greater than 500 nm (+/−30 nm).

The present invention likewise relates to processes for the preparation of these pigments in which $SiO_2$ flakes are coated with iron oxide, where the thicknesses of the $SiO_2$ flakes and the iron-oxide layers are selected in such a way that the total thickness of the red effect pigments is not greater than 500 nm (+/−30 nm).

The pigments according to the invention are distinguished by a particularly intense and pure red color effect. The red effect pigments surprisingly exhibit only a very slight color flop effect, or none at all, and are free from the interfering brown hue of other red pigments with iron-oxide layers. In addition, the pigments according to the invention have the advantage that they can be employed in a very wide variety of applications, where they exhibit improved applicational properties, for example a reduced haze effect and a better distinctness of image (DOI) in coating applications or a better skin feel in cosmetic formulations.

Owing to the advantageous properties, the effect pigments according to the invention are universally suitable for a large number of applications of a very wide variety of types. The present invention accordingly also relates to the use of these pigments in cosmetics, paints, coatings, plastics, films, in security printing, in security features in documents and identity papers, for coloring seed, for coloring foods or in medicament coatings and for the preparation of pigment compositions and dry preparations.

The pigments according to the invention are based on synthetic $SiO_2$ flakes as substrate which have a uniform layer thickness and are preferably prepared in accordance with International Application WO 93/08237 on a continuous belt by solidification and hydrolysis of a water-glass solution. Uniform layer thickness here is taken to mean a layer-thickness tolerance of from 3 to 10%, preferably from 3 to 5%, of the total dry layer thickness of the particles. The flake-form silicon dioxide particles are generally in amorphous form. Synthetic flakes of this type have the advantage over natural materials, such as, for example, mica, that the layer thickness can be adjusted with regard to the desired effects and the layer-thickness tolerance is limited.

The diameter of the substrates is usually between 1 and 250 μm, preferably between 2 and 100 μm. Their thickness is between 250 and 400 nm and preferably from 330 to 350 nm. The average aspect ratio of the flake-form substrates, i.e. the ratio of the average length measurement value, which here corresponds to the average diameter, to the average thickness measurement value, is usually from 5 to 200, preferably from 20 to 150 and particularly preferably from 30 to 120.

The said substrates in the pigments according to the invention are coated with iron-oxide layers, in particular with haematite layers ($\alpha$-$Fe_2O_3$). The thickness of the individual iron-oxide layers is between 30 and 150 nm, preferably from 50 to 130 nm. The total thickness of the red effect pigments is not greater than 500 nm (+/−30 nm). The coating of the SiO$_2$ flakes with iron oxide may be present either only on the two largest opposite surfaces or in a sheathing manner; the SiO$_2$ flakes are preferably completely sheathed with iron oxide. In cross section, the following pigment structure arises from this:

The sum of the thicknesses of the total of three layers does not exceed the requisite 500 nm (+/−30 nm).

In order to optimize the desired pure red hue, precise matching of the thicknesses of the substrate and of the iron-oxide layers is advantageous. The following distributions of the thicknesses for the substrates and the individual iron-oxide layers are particularly preferred here:

| Thickness of the SiO$_2$ matrix [nm] | Thickness of the two Fe$_2$O$_3$ layers (each) [nm] | Total thickness of the red pigments [nm] |
|---|---|---|
| 250 | 125 +/− 15 | 500 +/− 30 |
| 300 | 100 +/− 15 | 500 +/− 30 |
| 350 | 75 +/− 15 | 500 +/− 30 |
| 400 | 50 +/− 15 | 500 +/− 30 |

In a further embodiment of the present invention, the effect pigments according to the invention can furthermore be provided with an additional stabilizing organic coating as outer layer. Examples of such coatings are given, for example, in EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805, the disclosure content of which is incorporated herein by way of reference. Effect pigments comprising an organic coating, for example of organosilanes or organotitanates or organozirconates, additionally, besides the above-mentioned optical properties, exhibit increased stability to weathering influences, such as, for example, moisture and light, which is of particular interest for industrial coatings and in the automobile sector. The stabilization can be improved by inorganic components of the additional coating. Overall, the respective proportions for the additional stabilizing coating should be selected in such a way that the optical properties of the effect pigments according to the invention are not significantly influenced.

The present invention likewise relates to processes for the preparation of these pigments in which SiO$_2$ flakes are coated with iron oxide, where the thicknesses of the SiO$_2$ flakes and of the iron-oxide layers are selected in such a way that the total thickness of the red effect pigments is not greater than 500 nm (+/−30 nm). The respective matching of the thicknesses of the substrates to the thicknesses of the applied iron-oxide layers has already been explained above.

The coating with iron-oxide layers can be carried out by wet-chemical methods and/or by CVD or PVD processes.

The processes according to the invention for the preparation of the effect pigments are preferably wet-chemical processes in which use can be made of the known wet-chemical coating technologies developed for the preparation of pearlescent pigments, which are described, for example, in the following publications:

DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017.

For the coating, the SiO$_2$ flakes are suspended in water and coated with iron oxide by addition and precipitation of corresponding inorganic metal compounds, with the pH necessary for the precipitation of iron oxide being set and kept constant by simultaneous addition of acid or base, and the coated substrate is subsequently separated off from the aqueous suspension, dried and optionally calcined, with the layer thicknesses of the individual layers being set in such a way that, after drying and optional calcination, the thickness of the pigment is not greater than 500 nm (+/−30 nm).

The calcination temperature is generally between 250 and 1000° C., in particular between 350 and 900° C.

In principle, CVD or PVD processes for the coating of particles with iron oxide are also suitable for the preparation of the pigments according to the invention. Processes of this type are described, for example, in W. Ostertag, Nachr. Chem. Tech. Lab 1994, 42, 849. It is necessary here for the substrate to be kept in uniform motion during the vapor-deposition process in order that a homogeneous coating of all particle surfaces is ensured.

In addition, in a process which is likewise in accordance with the invention, an organic coating can additionally be applied as outer layer. Examples of coating processes of this type are given, inter alia, in EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805. Examples of organic coatings and the associated advantages have already been described above under the structure of the pigments according to the invention. The process step of application of the organic coating can follow directly after the other steps of the process according to the invention. The substances applied here only have a proportion by weight of from 0.1 to 5% by weight, preferably from 0.5 to 3% by weight, in the pigment as a whole.

The effect pigments according to the invention can be employed in a variety of applications. Accordingly, the present invention likewise relates to the use of the pigments according to the invention in cosmetics, paints, coatings, plastics, films, in security printing, in security features in documents and identity papers, for coloring seed, for coloring foods or in medicament coatings and for the preparation of pigment compositions and dry preparations.

In the case of cosmetics, the effect pigments according to the invention are particularly suitable for products and formulations in decorative cosmetics, such as, for example, nail varnishes, coloring powders, lipsticks or eyeshadows, soaps, toothpastes, etc. The effect pigments according to the invention can of course also be combined in the formulations with cosmetic raw materials and assistants of all types. These include, inter alia, oils, fats, waxes, film formers, preservatives and assistants which generally determine the applicational properties, such as, for example, thickeners and rheological additives, such as, for example, bentonites, hectorites, silicon dioxide, Ca silicates, gelatine, high-molecular-weight carbohydrates and/or surface-active assistants, etc. The formulations comprising effect pigments according to the invention may be of the lipophilic, hydrophilic or hydrophobic type. In the case of heterogeneous formulations having discrete aqueous and non-aqueous phases, the particles according to the invention may be present in each case in only one of the two phases or alternatively distributed over both phases.

The pH values of the aqueous formulations can be between 1 and 14, preferably between 2 and 11 and particularly preferably between 5 and 8. The concentrations of the effect pigments according to the invention in the formulation are unlimited. They may—depending on the application—be between 0.001 (rinse-off products, for example shower gels) and 99% (for example luster-effect articles for particular applications). The effect pigments according to the invention may furthermore also be combined with cosmetic active ingredients. Suitable active ingredients are, for example, insect repellents, UV A/BC protection filters (for example OMC, B3, MBC), anti-ageing active ingredients, vitamins and derivatives thereof (for example vitamin A, C, E, etc.), self-tanning agents (for example DHA, erythrulose, inter alia), and further cosmetic active ingredients, such as, for example, bisabolol, LPO, ectoine, emblica, allantoin, bioflavonoids and derivatives thereof.

On use of the effect pigments in paints and coatings, all areas of application known to the person skilled in the art are possible, such as, for example, powder coatings, automobile paints, printing inks for gravure, offset, screen or flexographic printing, and coatings in outdoor applications. The paints and coatings here may be, for example, radiation-curing, physically drying or chemically curing. For the preparation of printing inks or liquid coatings, a multiplicity of binders, for example based on acrylates, methacrylates, polyesters, polyurethanes, nitrocellulose, ethylcellulose, polyamide, polyvinyl butyrate, phenolic resins, maleic resins, starch or polyvinyl alcohol, amino resins, alkyd resins, epoxy resins, polytetrafluoroethylene, polyvinylidene fluorides, polyvinyl chloride or mixtures thereof, in particular water-soluble grades, are suitable. The coatings can be powder coatings or water- or solvent-based coatings, where the choice of the coating constituents is subject to the general knowledge of the person skilled in the art. Common polymeric binders for powder coatings are, for example, polyesters, epoxides, polyurethanes, acrylates or mixtures thereof.

In addition, the effect pigments according to the invention can be used in films and plastics, thus, for example, in agricultural sheeting, infrared-reflective films and sheets, gift foils, plastic containers and moldings for all applications known to the person skilled in the art. Suitable plastics for incorporation of the effect pigments according to the invention are all common plastics, for example thermosets or thermoplastics. A description of the possible applications and suitable plastics, processing methods and additives is given, for example, in RD 472005 or in R. Glausch, M. Kieser, R. Maisch, G. Pfaff, J. Weitzel, Perlglanzpigmente [Pearlescent Pigments], Curt R. Vincentz Verlag, 1996, 83 ff., the disclosure content of which is incorporated herein.

In addition, the effect pigments according to the invention are also suitable for use in security printing and in security-relevant features for, for example, counterfeiting-proof cards and identity papers, such as, for example, entry tickets, personal identity cards, banknotes, checks and check cards and for other counterfeiting-proof documents. In the area of agriculture, the effect pigments can be used for coloring seed and other starting materials, in addition in the foods sector for pigmenting foods. The effect pigments according to the invention can likewise be employed for pigmenting coatings in medicaments, such as, for example, tablets or dragees.

In the above-mentioned areas of application, the effect pigments according to the invention are likewise suitable for use in mixtures with organic dyes and/or pigments, such as, for example, transparent and opaque white, colored and black pigments, and with flake-form iron oxides, organic pigments, holographic pigments, LCPs (liquid crystal polymers) and conventional transparent, colored and black luster pigments based on metal oxide-coated flakes based on mica, glass, $Al_2O_3$, $Fe_2O_3$, $SiO_2$, etc. The effect pigments according to the invention can be mixed with commercially available pigments and fillers in any ratio.

Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be flake-form, spherical or needle-shaped, for example, in accordance with requirements.

The effect pigments according to the invention are furthermore suitable for the preparation of flowable pigment compositions and dry preparations comprising one or more particles according to the invention, binders and optionally one or more additives. The term dry preparations is also taken to mean preparations which comprise from 0 to 8% by weight, preferably from 2 to 8% by weight, in particular from 3 to 6% by weight, of water and/or of a solvent or solvent mixture. The dry preparations are preferably in the form of pellets, granules, chips, sausages or briquettes and have particle sizes of 0.2–80 mm. The dry preparations are used, in particular, in the preparation of printing inks and in cosmetic formulations.

BRIEF DESCRIPTION OF THE DRAWINGS

FIG. 1 represents a comparison of the red hues of the pigments according to the invention with those of the prior art.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

Example 1

100 g of $SiO_2$ flakes (365 nm in thickness) are heated to 75° C. in 2l of demineralized water. 1120 ml of $FeCl_3$ solution (corresponds to 130% of $Fe_2O_3$) are added with stirring. The pH of the reaction mixture is kept constant at 3 by addition of sodium hydroxide solution (30%). After addition of the $FeCl_3$ solution, the pH is raised to pH 5 using sodium hydroxide solution (30%). The product is filtered off and rinsed with demineralized water. After drying at 110° C., the product is calcined at 800° C.

The pigment prepared in this way exhibits the color behavior shown in FIG. 1 (-▲-).

Comparative Example 100 g of $SiO_2$ flakes (445 nm in thickness) are heated to 75° C. in 1 l of demineralized water. 237 ml of $FeCl_3$ solution (corresponds to 27.5% of $Fe_2O_3$) are added with stirring. The pH of the reaction mixture is kept constant at 3 by addition of sodium hydroxide solution (30%). After addition of the $FeCl_3$ solution, the pH is raised to pH 5 using sodium hydroxide solution (30%). The product is filtered off and rinsed with demineralized water. After drying at 110° C., the product is calcined at 800° C.

The pigment prepared in this way exhibits the color behavior shown in FIG. 1 (-♦-).

FIG. 1 shows the coloristic situation through a comparison of effect pigments having different red hues and different color flop behavior. The color curves here show the change in the color values in the a,b color system, which is obtained if a paint card containing the pigment is tilted from the perpendicular angle (90 degrees plan view) to 180 degrees (horizontal axis is the a axis, from left=green to right=red, vertical axis is the b axis, from bottom=blue to top=yellow). Typical iron-oxide mica pigments (-●-) are comparatively weak in color and exhibit no color flop. The typical brownish hue on tilting is not evident in the curve. A typical $SiO_2$ flake pigment having an iron-oxide coating as described in WO 93/08237 (-♦-) does not exhibit a clear red in the initial hue. On tilting, a strong color flop occurs; in the example it changes to green. The coloring of the pigment according to the invention (-▲-) shows a saturated red which also remains a red on tilting. The color always remains in one quadrant of the a,b color system, and the color flop is very small.

The entire disclosure[s] of all applications, patents and publications, cited herein and of corresponding German application No. 102005002124.7, filed Jan. 17, 2005 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A red effect pigment comprising iron oxide-coated SiO2 flakes, having a total thickness of said effect pigment not greater than 500 nm +/−30 nm.

2. The effect pigment according to claim 1, wherein the $SiO_2$ flakes have a diameter of 1 to 250 μm and a thickness of 250 to 400 nm.

3. The effect pigment according to claim 1, wherein thickness of the $SiO_2$ flakes is 250, 300, 350, or 400 nm.

4. The effect pigment according to claim 1, wherein the iron oxide is haematite.

5. The effect pigment according to claim 1, wherein the thickness of the iron-oxide is 30–150 nm.

6. The effect pigment according to claim 1, wherein an organic coating is additionally applied to the effect pigment.

7. A process for the preparation of an effect pigment according to claim 1, comprising coating $SiO_2$ flakes with iron oxide, selecting the thickness of the $SiO_2$ flakes and of the iron-oxide layers in such a way that the total thickness of the red effect pigment is not greater than 500 nm +/−30 nm.

8. The process according to claim 7, wherein coating with iron oxide is carried out in such a way that the thickness of the iron oxide is 30 to 150 nm.

9. The process according to claim 7, wherein coating with iron oxide is carried out by wet-chemical methods and/or by CVD or PVD.

10. In a cosmetic, paint, coating, plastic, film, security printed device, security feature of a document or identity paper, colored seed, colored food, medicament coating, or pigment composition comprising a pigment, the improvement wherein the pigment is one according to claim 1.

* * * * *